Patented May 10, 1949

2,469,413

UNITED STATES PATENT OFFICE 2,469,413

PROCESS FOR PREPARING BARIUM ALUMINATE

Paul S. Roller, Hyattsville, Md., assignor to the United States of America as represented by the Secretary of the Interior No Drawing. Application April 17, 1946, Serial No. 662,773

5 Claims. (Cl. 23—52)

(Granted under the act of March 3, 1883, as amended April 30, 1928; 370 O. G. 757)

The invention described herein may be manufactured and used by or for the Government of the United States for governmental purposes without the payment to me of any royalty thereon, in accordance with the provisions of the act of April 30, 1928 (Ch. 460, 45 Stat. L. 467).

This invention relates to the preparation of barium aluminate.

Heretofore, barium aluminate has been produced by high temperature synthesis of a mixture of barium sulfate and alumina, but the synthesis was carried out only with difficulty. For an appreciable rate of reaction, the required temperature was over 1400° C., but even then a relatively long period of time was required for the reaction to be substantially completed.

It is the present discovery that in the preparation of barium aluminate the reaction of a mixture of barium sulfate and alumina is accelerated and catalyzed by the addition of a small amount of soda ash or sodium carbonate. Within the limits explained more fully hereinafter, the catalytic effect increases with increase in the amount of the added sodium carbonate. Thus, the present invention accomplishes high temperature synthesis of barium aluminate with a substantial reduction in the time required for the reaction.

Accordingly, an object of this invention is to reduce substantially the time required for the high temperature synthesis of barium aluminate.

A further object is to provide a catalytic method for synthesizing barium aluminate.

Other objects and advantages will appear more fully from the following description and the appended claims.

In the practice of the present method, a mixture of barium sulfate and alumina are heated in the presence of a small amount of sodium carbonate to a high temperature. The product of the reaction is barium aluminate.

The barium sulfate used in this process may be precipitated barium sulfate or barytes. The alumina may be pure alumina ($Al_2O_3$), alumina trihydrate ($Al_2O_3.3H_2O$) or bauxite.

In preparation for the high temperature synthesis of barium aluminate, a mixture of barium sulfate, alumina and sodium carbonate is provided, the mixture having a fineness of about 200 screen mesh. The three components may be reduced to the desired fineness before or after they are mixed.

The barium sulfate and alumina are mixed substantially in molecular proportions. The sodium carbonate is added in small proportions. Excellent catalytic action is secured when two parts by weight of the sodium carbonate are added for each 100 parts by weight of the barium sulfate, although the amount of added sodium carbonate may be lowered to as little as one-quarter part by weight and increased to as much as four parts by weight. Thus, the range in proportions for the sodium carbonate may be stated as up to about four parts by weight to each one hundred parts by weight of barium sulfate.

Barium aluminate may be secured by the treatment of the 200 screen mesh mixture of barium sulfate, alumina and sodium carbonate to a temperature of 1450° C., which is the preferred temperature for this catalytic reaction. However, temperatures in the range of 1200° C. to 1600° C. may be used. At temperatures about or slightly above 1200° C., the reaction proceeds more slowly than at 1450° C. Temperatures near or about 1600° C. are difficult to reach and require special and more expensive equipment.

The reaction may be carried out under either oxidizing or reducing conditions, but a reducing atmosphere is preferred. The reducing atmosphere may be secured by adding carbon in small amount to the mixture or by providing a reducing flame when the reaction is carried out in a kiln.

The following examples demonstrate the advantage secured by the use of sodium carbonate in a 200 screen mesh mixture of sodium sulfate and alumina in molecular proportions to yield mono-barium aluminate.

At a temperature of 1450° C., the reaction is 71 per cent complete at the end of four and one-half hours when no sodium carbonate is present. With the same mixture, the same temperature and at the end of the same period (4½ hours), the reaction is (1) 77 per cent complete with added sodium carbonate in an amount of one-fourth part by weight to each 100 parts by weight of barium sulfate, (2) 81 per cent complete with added sodium carbonate in an amount of one-half part by weight, (3) 90 per cent complete with added sodium carbonate in an amount of one part by weight.

The inclusion of two parts by weight of sodium carbonate to each 100 parts by weight of barium aluminate has a decidedly marked effect whether the reaction is carried out in either an oxidizing or reducing atmosphere. For example, at 1450° C. in an oxidizing atmosphere, seven and one-half hours are required to convert seventy per cent of barium sulfate to mono-barium aluminate when no sodium carbonate is present.

Under the same temperature and conditions and with the same mixture, but with two parts by weight of sodium carbonate added to each 100 parts by weight of barium sulfate, only four hours are required to convert seventy per cent of the barium sulfate to mono-barium aluminate. The same reaction at 1450° C. in a reducing atmosphere requires a heat treatment of three and one-half hours to secure ninety per cent conversion of the barium sulfate to mono-barium aluminate when no sodium carbonate is present, but this heat treating time is reduced to one and three-quarters hours when two parts by weight of sodium carbonate are added for each 100 parts by weight of sodium sulfate. Thus, by the use of both two parts by weight of sodium carbonate and a reducing atmosphere, the reaction time is decreased to about one-fourth of that required under ordinary conditions.

The sodium carbonate is included in the barium aluminate product as an impurity. The impurity tolerance for barium aluminate is controlled by its intended use. Thus, the impurity tolerance suggests in each case the maximum percentage of sodium carbonate which may be used. As a sulfate removal agent, the permissible tolerance for barium aluminate is such that up to about two parts by weight of sodium carbonate may be used for each 100 parts by weight of barium sulfate in the production of barium aluminate.

Desirable results are secured by use of as little as one-fourth part by weight of sodium carbonate. With such small amount, the resulting barium aluminate will contain the sodium carbonate as an impurity and in an amount well within the tolerance of barium aluminate for most of its normal uses.

For some uses of barium aluminate permitting higher impurity tolerances, the sodium carbonate may be employed in greater amount and up to four parts by weight for each 100 parts of barium sulfate in the starting mixture of barium sulfate and alumina.

When used in small amounts (up to four parts by weight) as indicated, the sodium carbonate acts as a catalyst. As the amount of sodium carbonate is increased through the indicated range, the catalytic effect is increased, but with increase in impurities in the final product. The increase in catalytic effect results from greater coverage of the reacting material by the sodium carbonate.

The foregoing description is to be understood as illustrative since this invention includes all modifications and embodiments coming within the scope of the appended claims.

I claim:

1. The process of producing barium aluminate comprising the steps of mixing a small proportion of sodium carbonate as a separate component with barium sulfate and alumina, and heating said mixture at a temperature in the range of about 1200° centigrade to about 1600° centigrade.

2. A process as defined in claim 1 wherein the barium sulfate, alumina and sodium carbonate have a fineness of 200 screen mesh when initially subjected to the heat treatment.

3. A process as defined in claim 1 wherein the sodium carbonate is present in an amount of not more than 4 parts by weight to each 100 parts by weight of barium sulfate, and the heating step is carried out in a reducing atmosphere.

4. The process of producing barium aluminate comprising the steps of mixing a small proportion of sodium carbonate as a separate component with barium sulfate and alumina, said sulfate and said alumina being mixed in molecular proportions such as to yield mono-barium aluminate, and heating said mixture of carbonate, sulfate and alumina in a reducing atmosphere to a temperature on the order of 1450° centigrade, said mixture having a fineness on the order of 200 screen mesh, and said sodium carbonate being present in an amount of about two parts by weight to each 100 parts by weight of the barium sulfate.

5. In the production of barium aluminate which process includes the heating at an elevated temperature of a mixture of barium sulfate and alumina, the improvement which comprises incorporating in the reaction mixture a small proportion of sodium carbonate as a catalyst.

PAUL S. ROLLER.

REFERENCES CITED

The following references are of record in the file of this patent:

UNITED STATES PATENTS

| Number | Name | Date |
| --- | --- | --- |
| 1,680,066 | Rothe et al. | Aug. 7, 1928 |
| 1,826,895 | Muller et al. | Oct. 13, 1931 |
| 2,375,715 | Williams | May 8, 1945 |
| 2,405,275 | Stowe | Aug. 6, 1946 |